J. RIDER.

Swivel Loop for Fire-Arms.

No. 5,200. Reissued Dec. 24, 1872.

*Witnesses.*

Harry King.

W. W. Dodge.

*Inventor.*

Joseph Rider by Dodgeson

Attys

AM. PHOTO-LITHOGRAPHIC CO. N.Y. (OSBORNE'S PROCESS.)

UNITED STATES PATENT OFFICE.

JOSEPH RIDER, OF NEWARK, OHIO, ASSIGNOR TO HIMSELF AND E. REMINGTON & SONS, OF ILION, NEW YORK.

IMPROVEMENT IN SWIVEL-LOOPS FOR FIRE-ARMS.

Specification forming part of Letters Patent No. 74,427, dated February 11, 1868; reissue No. 5,200, dated December 24, 1872.

*To all whom it may concern:*

Be it known that I, JOSEPH RIDER, of Newark, in the county of Licking and State of Ohio, have invented certain new and useful Improvements in Stocking or Mounting Fire-Arms; and I do hereby declare that the following is a full, clear, and exact description thereof, reference being had to the accompanying drawing making part of this specification and to the letters of reference marked thereon, like letters indicating like parts wherever they occur.

To enable others skilled in the art to construct and use my invention, I will proceed to describe it.

My invention consists of a swivel-loop for fire-arms, which is made by bending a small metal rod or piece of wire into the required shape, and inserting its ends loosely into holes or recesses made in the sides of a lug projecting from the under side of the band, guard, or loop-plate, and securing it there by a pin or stop, which serves to prevent end motion, as hereinafter more fully explained.

Figure 1:
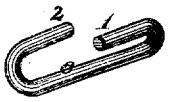
Figure 2:
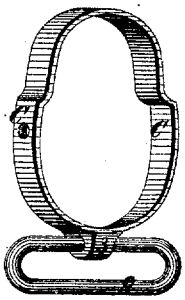
Figure 3:
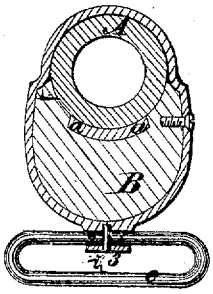
Figure 4:
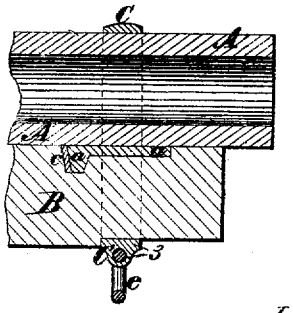

Figure 1 represents the bow of the swivel-loop detached; Fig. 2 is a perspective view of the swivel-loop connected to a band; Fig. 3, a transverse section through the barrel stock and band; and Fig. 4, a longitudinal section of the same.

A represents a portion of the barrel, and B the stock of a fire-arm. On the under side of the barrel I weld or forge a lug, *a*, of the form shown in Fig. 4, having its rear end inclined, and in the stock I form a corresponding recess for the lug to fit into, so that when the two are laid together, and the band C slipped on or over them, they are securely fastened together, and any end motion of the one on the other is prevented. If desired the rear or inclined face of the recess may be provided with a piece of brass or other metal, as represented at *c*, Fig. 4, to prevent the wood from bruising or wearing, and for the lug *a* to bear against. My improved swivel-loop I make by forming on the under side of the band C, or of the swivel-plate, in case one is to be used, a shoulder or projection, 3, which has a hole drilled through it for the ends of the loop *e* to rest in. I then take a piece of wire or small iron rod, and, after cutting it of the required length, bend it into the form shown in Fig. 1, and then insert the ends 1 and 2 into the hole in the shoulder 3, as represented in Fig. 2, and insert a small pin, *i*, between the ends of the loop *e*, as shown in Fig. 3, to hold it in place.

When thus arranged the loop *e* is free to turn in its bearings in the shoulder 3; but it cannot move endwise nor be taken out without either springing it open endwise or removing the pin.

By this method of constructing the swivel-loop it is very much simplified and cheapened.

Having thus described my invention, what I claim is—

In combination with the lug or shoulder 3 formed on a gun band, guard, or loop-plate, the loop *e*, consisting of the bent rod with its ends fitted into a hole or recess in said shoulder, and a stop arranged to prevent end motion of the loop, substantially as described.

Witnesses: JOSEPH RIDER.

J. B. PELTON,

CHAS. R. DARBY.